(12) United States Patent
Stedman

(10) Patent No.: US 8,782,776 B2
(45) Date of Patent: Jul. 15, 2014

(54) PHOTO COMBINATION LOCK

(75) Inventor: Roy Stedman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 18 days.

(21) Appl. No.: 13/343,057

(22) Filed: Jan. 4, 2012

(65) Prior Publication Data

US 2013/0174247 A1  Jul. 4, 2013

(51) Int. Cl.
*G06F 21/00* (2013.01)
*G06F 21/36* (2013.01)

(52) U.S. Cl.
CPC ...................... *G06F 21/36* (2013.01)
USPC ............ 726/16; 726/5; 726/6; 726/7; 726/17; 726/19; 713/183; 713/184; 713/202

(58) Field of Classification Search
USPC ......... 726/16, 19, 1–7, 17; 382/115; 713/202, 713/183, 184
See application file for complete search history.

(56) References Cited

U.S. PATENT DOCUMENTS

| | | | |
|---|---|---|---|
| 2010/0083353 A1* | 4/2010 | Wang | 726/5 |
| 2010/0322485 A1* | 12/2010 | Riddiford | 382/115 |
| 2011/0154482 A1* | 6/2011 | Heiner et al. | 726/19 |

* cited by examiner

*Primary Examiner* — Kambiz Zand
*Assistant Examiner* — Noura Zoubair
(74) *Attorney, Agent, or Firm* — Terrile, Cannatti, Chambers & Holland, LLP; Stephen A. Terrile

(57) ABSTRACT

A simple, customizable and intuitive virtual combination unlock method and system. More specifically, an unlock system and method is disclosed which includes a virtual combination lock, where the virtual combination lock includes several rows of user-selectable images such as pictures or icons as the virtual combination wheels. In certain embodiments, the images are accessed via the user's database. To unlock the device, the user touches and drags pre-selected images into alignment with each other. Security can be adjusted by changing the number of images that need to be aligned to unlock the device.

12 Claims, 3 Drawing Sheets

PHOTO COMBINATION LOCK

BACKGROUND OF THE INVENTION

1. Field of the Invention

The present invention relates to information handling systems and more particularly to a combination lock used for information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with device locking capabilities. Locks for use with phones, tablets and touch screen information handling systems are well-known. Certain devices, such as the certain smart phones use a slide or swipe to unlock function. Other smart phones use patterns or pin numbers to provide unlocking function. It is also known to use picture passwords where a user taps on preset areas of a photo to unlock a device.

SUMMARY OF THE INVENTION

In accordance with the present invention, a simple, customizable and intuitive virtual combination unlock method and system are disclosed. More specifically, an unlock method is disclosed which includes a virtual combination lock, where the virtual combination lock includes several rows of user-selectable images such as pictures or icons as the virtual combination wheels. In certain embodiments, the images are accessed via the user's database. To unlock the device, the user touches and drags pre-selected images into alignment with each other. Security can be adjusted by changing the number of images that need to be aligned to unlock the device. If the wheels appear with random indexes, the screen smears would not be usable to determine the unlock pattern. Additionally, in certain embodiments, the wheels are replaced by a grid or other-type arrangement where images are dropped into appropriate slots.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
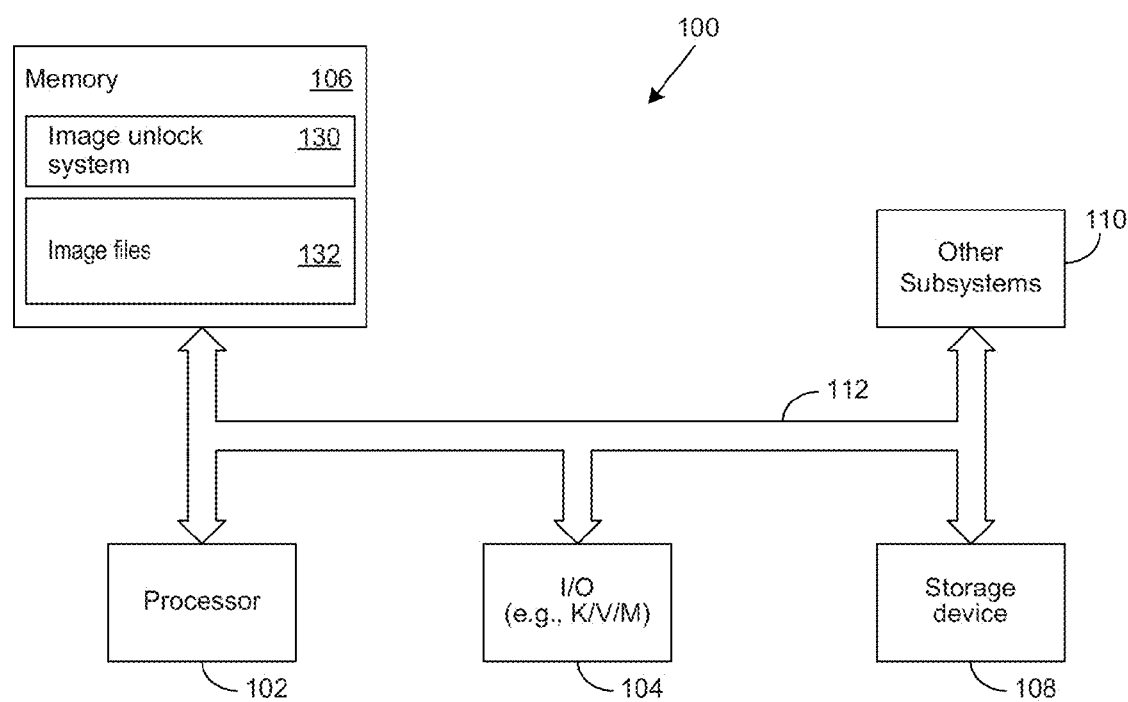
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112. The memory 106 also stores an image unlock lock system 130 as well as image files 132.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
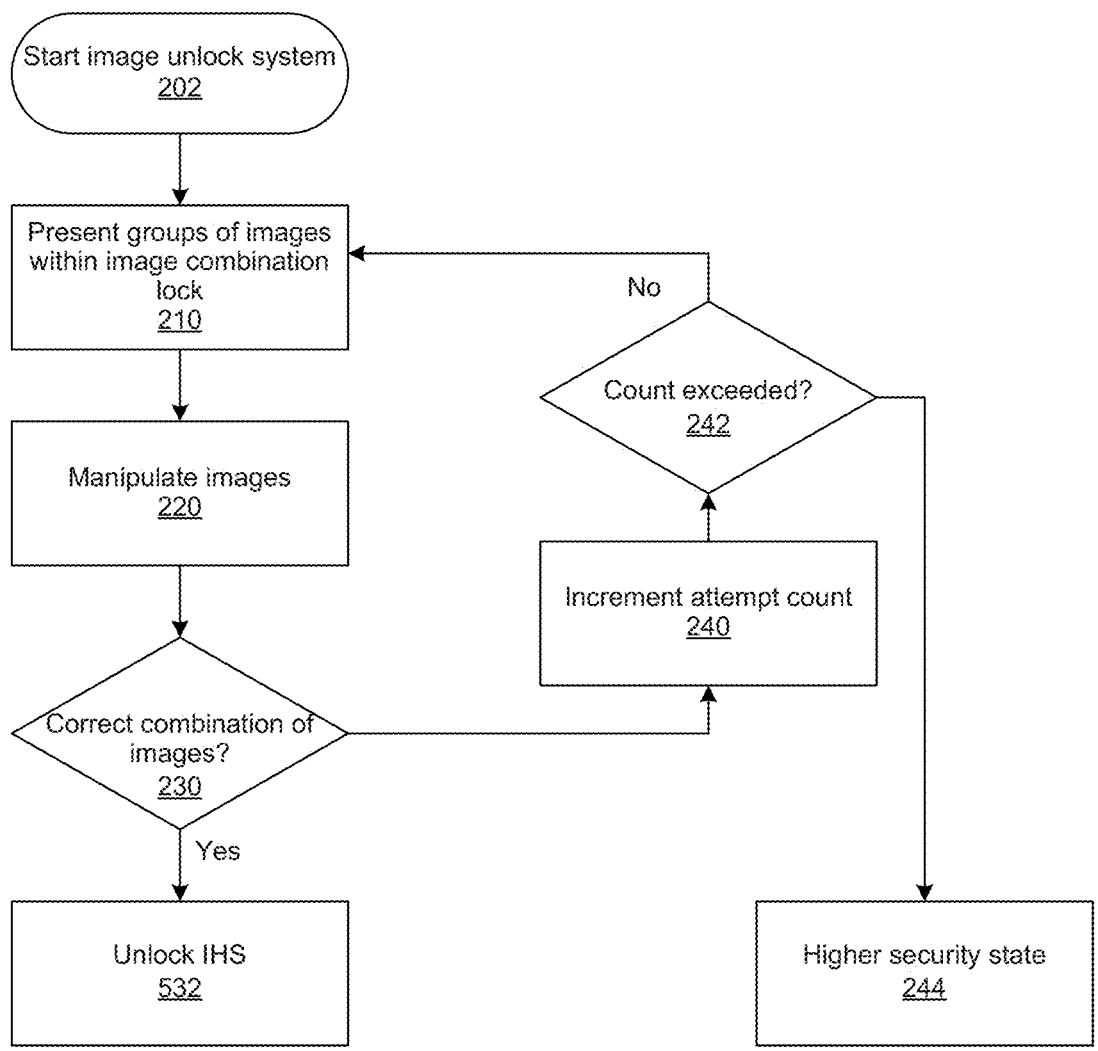
FIG. 2 shows a flow chart of the operation of a photo combination lock system.

Referring to FIG. 2, a flow chart of the operation of an image combination lock system is shown. More specifically, when the image unlock system 130 is accessed at step 202, the image unlock system 130 presents a combination lock with sets of images at step 210. Each set of images is presented as a row of user selectable images such as pictures or icons. In certain embodiments, the images are derived from the image database of the user so that the images are familiar to the user.

Next, at step 220, the user manipulates (e.g., touches and drags) the rows of images to align certain images with each other to provide an image combination set. Next at step 230, the image unlock system 130 determines whether the correct combination of images have been aligned. If so, then the information handling system 100 is unlocked at step 232.

If the correct combination of images are not aligned then the image unlock system increments an attempt count at step 240 and then determines whether a predefined number of attempts have been attempted (as indicated by the attempt count) at step 242. If more than a predefined number of attempts have been attempted, then the information handling system 100 is placed in a higher security state at step 244. If the number of predefined attempts has not been exceeded, then the image unlock system 130 returns to presenting a set of images at step 210. In certain embodiments, the images may be scrambled before the images are presented.

Figure 3:
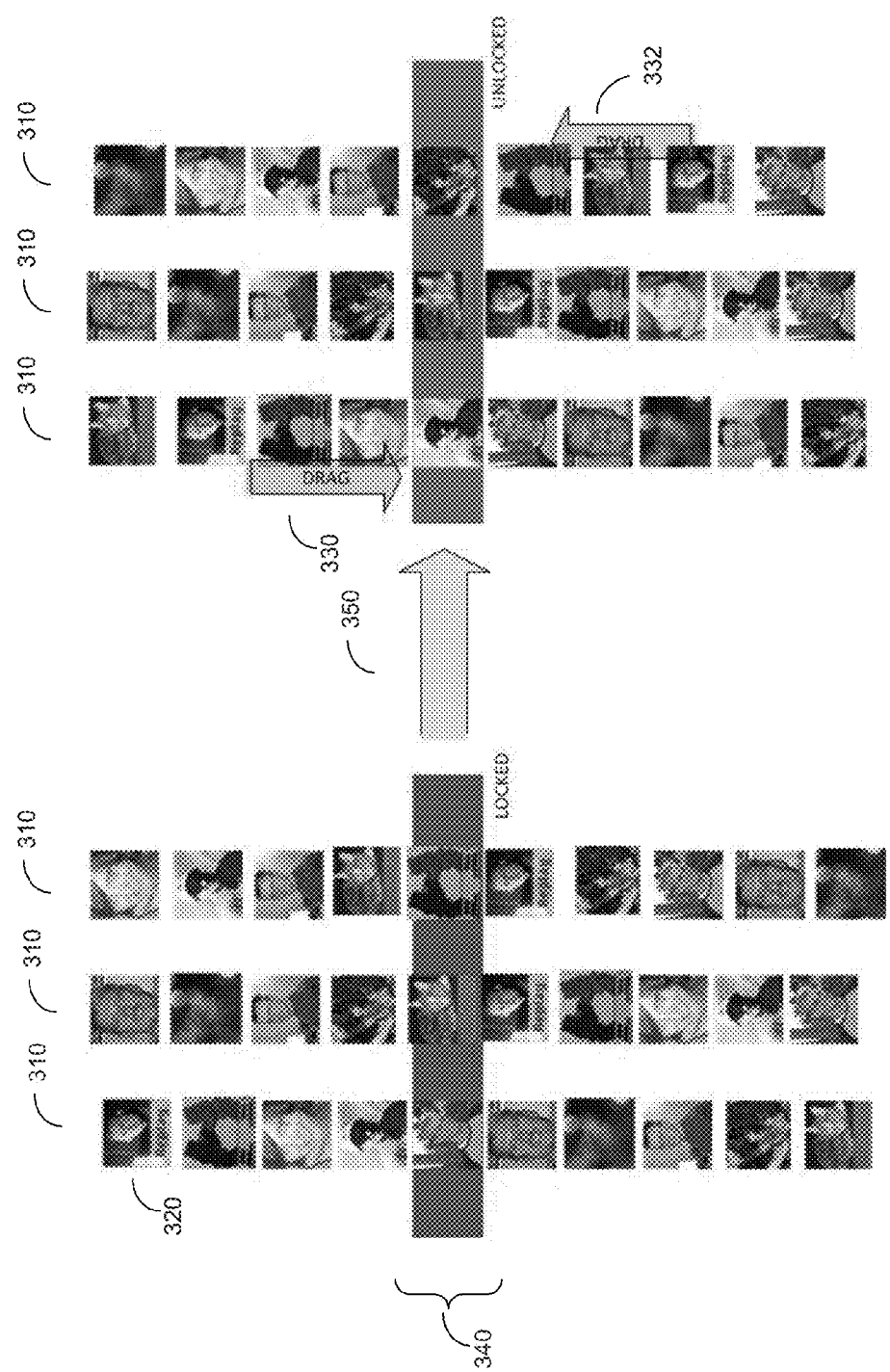
FIG. 3 shows a sample screen presentation of a photo combination lock system.

Referring to FIG. 3, a sample screen presentation of an image combination lock system is shown. More specifically, the image combination lock system includes a plurality of groups of images such as columns 310 of images 320. Each of the groups of images are manipulated to move the images into alignment such as by dragging one group down 330 and another group up 332. When a particular row of images 340 matches a predetermined image combination, then then information handling system is transitions from a locked configuration to an unlocked configuration 350.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function as will occur to those ordinarily skilled in the pertinent arts. The depicted and described embodiments are examples only, and are not exhaustive of the scope of the invention.

For example, security can be adjusted by changing the number of images that need to be aligned to unlock the device. Additionally, if the wheels appear with random indexes, the screen smears would not be usable to determine the unlock pattern. Additionally, the wheels can be replaced by a grid or other-type arrangement where images are dropped into appropriate slots.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for providing security to an information handling system comprising:
presenting a plurality of groups of images, each of the plurality of groups of images comprising a plurality of images;
enabling manipulation of at least one image from each of the plurality of groups of images such that the at least one from the plurality of groups of images are adjacent;
determining when the at least one image from the plurality of groups of images are aligned such that the at least one image from the plurality of groups of images correspond to a predetermined combination of images; and,
enabling security settings to be adjusted by changing a number of images that need to be aligned to unlock the information handling system; and wherein
each of the plurality of groups of images comprise a respective row of images; and,
the manipulation comprises dragging images from the respective rows of images into alignment.

2. The method of claim 1 further comprising:
presenting screen smears on a display device of the information handling system, the screen smears being presented so as to not be usable to determine the unlock pattern, the screen smears causing an appearance of images such that the images cannot be selected to determine the unlock pattern.

3. The method of claim 1 wherein:
the groups of images are presented in a grid type arrangement; and,
manipulating the images further comprises dragging and dropping images into appropriate slots.

4. The method of claim 1 wherein:
the images comprise at least one of photos, icons, screen shots of motion video and segments of motion video.

5. An information handling system comprising:
a processor;
memory coupled to the process, the memory storing a system for providing security to an information handling system, the system comprising instructions executable by the processor for:
presenting a plurality of groups of images, each of the plurality of groups of images comprising a plurality of images;
enabling manipulation of at least one image from each of the plurality of groups of images such that the at least one from the plurality of groups of images are adjacent;
determining when the at least one image from the plurality of groups of images are aligned such that the at least one image from the plurality of groups of images correspond to a predetermined combination of images; and,
enabling security settings to be adjusted by changing a number of images that need to be aligned to unlock the information handling system; and wherein
each of the plurality of groups of images comprise a respective row of images; and,
the manipulation comprises dragging images from the respective rows of images into alignment.

6. The information handling system of claim 5 further comprising:
presenting screen smears on a display device of the information handling system, the screen smears being presented so as to not be usable to determine the unlock pattern, the screen smears causing an appearance of images such that the images cannot be selected to determine the unlock pattern.

7. The information handling system of claim 5 wherein:
the groups of images are presented in a grid type arrangement; and,
manipulating the images further comprises dragging and dropping images into appropriate slots.

8. The information handling system of claim 5 wherein:
the images comprise at least one of photos, icons, screen shots of motion video and segments of motion video.

9. A non-transitory computer readable media, the computer readable media storing a system for providing security to an information handling system, the system comprising instructions executable by a processor for:
presenting a plurality of groups of images, each of the plurality of groups of images comprising a plurality of images;
enabling manipulation of at least one image from each of the plurality of groups of images such that the at least one from the plurality of groups of images are adjacent;
determining when the at least one image from the plurality of groups of images are aligned such that the at least one image from the plurality of groups of images correspond to a predetermined combination of images; and,
enabling security settings to be adjusted by changing a number of images that need to be aligned to unlock the information handling system; and wherein
each of the plurality of groups of images comprise a respective row of images; and,
the manipulation comprises dragging images from the respective rows of images into alignment.

10. The non-transitory computer readable media of claim 9 further comprising:
presenting screen smears on a display device of the information handling system, the screen smears being presented so as to not be usable to determine the unlock pattern, the screen smears causing an appearance of images such that the images cannot be selected to determine the unlock pattern.

11. The non-transitory computer readable media of claim 9 wherein:
the groups of images are presented in a grid type arrangement; and,
manipulating the images further comprises dragging and dropping images into appropriate slots.

12. The non-transitory computer readable media of claim 9 wherein:
the images comprise at least one of photos, icons, screen shots of motion video and segments of motion video.

* * * * *